United States Patent [19]

Tibbs

[11] 4,386,593
[45] Jun. 7, 1983

[54] FUEL-AIR INJECTION CONTROL SYSTEM FOR INTERNAL COMBUSTION ENGINES

[75] Inventor: Oscar Tibbs, Ripley, Tenn.

[73] Assignees: William Dan Douglas, Jr.; Diane Douglas Wood; Paul E. Conway

[21] Appl. No.: 262,824

[22] Filed: May 12, 1981

[51] Int. Cl.³ .......................................... F02M 17/26
[52] U.S. Cl. .................................... 123/523; 123/527
[58] Field of Search ............... 123/522, 523, 524, 527, 123/556, 557, 545, 547

[56] References Cited

U.S. PATENT DOCUMENTS

| | | | |
|---|---|---|---|
| 1,381,331 | 6/1921 | Pohl | 123/556 |
| 2,684,059 | 7/1954 | Schneider | 123/590 |
| 3,762,385 | 10/1973 | Hollnagel | 123/545 |
| 4,003,356 | 1/1977 | Naylor | 123/557 |
| 4,083,343 | 4/1978 | Paton | 123/556 |
| 4,167,166 | 9/1979 | Varner et al. | 123/556 |
| 4,216,751 | 8/1980 | Davison et al. | 123/523 |
| 4,270,506 | 6/1981 | Lowe | 123/523 |
| 4,286,564 | 9/1981 | Van Tuyl | 123/545 |
| 4,303,051 | 12/1981 | Weishaar | 123/557 |

Primary Examiner—Charles J. Myhre
Assistant Examiner—E. Rollins Cross
Attorney, Agent, or Firm—Larson and Taylor

[57] ABSTRACT

A fuel-air injection control system is provided for internal combustion engines using gasoline as a fuel. The system includes a vacuum pump which is connected to an airtight fuel supply tank containing a liquid gasoline such that operation of the vacuum pump causes a portion of the liquid gasoline to be continuously vaporized. The vaporized but unheated gasoline is passed through a filter where unwanted contaminants are removed and is delivered to the intake ducts of the internal combustion engine. Heated air is also supplied to these intake ducts and the vaporized gasoline combines with heated combustion air therein for subsequent ignition in the combustion chambers. The flow of heated combustion air is controlled by the operator to control the speed of the engine.

23 Claims, 6 Drawing Figures

FUEL-AIR INJECTION CONTROL SYSTEM FOR INTERNAL COMBUSTION ENGINES

FIELD OF THE INVENTION

This invention relates to a fuel-air injection control system for supplying vaporized gasoline and heated combustion air to the combustion chambers of an internal combustion engine.

BACKGROUND OF THE INVENTION

Due to the ever rising price of gasoline and the continued popularity of motor vehicles as a mode of transportation, much effort in the prior art has been directed to increasing the efficiency and/or gas mileage in motor vehicles. In addition, and often to the detriment of obtaining better gas mileage, further efforts in the prior art have been directed towards reducing the various pollutants emitted from motor vehicles. Needless to say, the prior art includes many different approaches to the problems of increasing the efficiency of internal combusion engines and for reducing the pollutants thereof.

Some of these prior art approaches are disclosed in the patented art. For example, in U.S. Pat. No. 4,177,779 (Ogle), a fuel economy system is disclosed in which the vacuum from an engine is used to draw gasoline vapors and air from the gasoline tank of the motor vehicle with the gasoline in the tank being heated by the engine coolant. Another prior art system, disclosed in U.S. Pat. No. 3,696,799 (Gauck), feeds gas vapors which normally escape from the gasoline tank to the carburetor to increase the gas mileage of the vehicle. In yet another system, disclosed in U.S. Pat. No. 3,630,698 (Baldwin), the vacuum of the engine is used to vaporize fuel located in a container, the vaporized fuel then being fed along with air to the combustion chamber.

In addition to the systems discussed above, a number of other systems have been devised for vaporizing gasoline. For example, the system disclosed in U.S. Pat. No. 4,191,153 (Strem et al) includes a supporting member to which the liquid gasoline is applied, the liquid gas being evaporated by air passing through this supporting member. A similar vaporizing system is disclosed in U.S. Pat. No. 4,197,820 (Trudel). In the latter system, gas vapors are picked up by ambient air passing through a splash assembly located in the fuel supply tank. Another common type of vaporization system uses air which is bubbled through the liquid gasoline. Typical of these systems are the devices disclosed in U.S. Pat. No. 4,011,847 (Fortino) and U.S. Pat. No. 474,838 (Lambert). A similar system in which air is bubbled through heated fuel is disclosed in U.S. Pat. No. 1,938,497 (Pogue). Vaporized fuel produced by air bubbling can also be used as a supplement to a carburetor as disclosed in U.S. Pat. No. 3,749,376 (Alm et al).

The prior art also provides for the use of heated combustion air to aid in the vaporization of gasoline. For example, in U.S. Pat. No. 4,083,343 (Paton), heated combustion air is added to the fuel/air mixture produced by the carburetor. In another prior art system, disclosed in U.S. Pat. No. 3,116,988 (Lauder), the atomized fuel and a small percentage of air are passed through a heating chamber where the fuel is vaporized. Next, unheated combustion air is added to the fuel/air mixture which is then introduced into the intake manifold of the internal combustion engine.

The foregoing patents represent only a relatively small number of the many attempts in the prior art to increase fuel efficiency and/or reduce pollutant emissions of internal combustion engines. However, the achievements of the prior art have obviously not been as great as desired and it is clear that the need for greater fuel efficiencies in internal combustion engines producing less pollutant emissons is still very much in existence and is one which is becoming increasingly critical.

SUMMARY OF THE INVENTION

In accordance with the invention, an improved fuel-air injection system for gasoline powered internal combustion engines is provided which affords very substantial fuel economies. Initial testing has indicated remarkable savings in situations where the system of the invention has been adapted to existing engines of different sizes and types, including small and large cars as well as trucks. In fact, it is an important feature of the invention that the system is easily and inexpensively adapted to basically all existing internal combustion engines which are capable of using gasoline or similar fuels. A further important feature of the invention concerns the reduction of pollutants produced by engines incorporating the system and, in particular, the reduction of those pollutants associated with unburned fuel.

The system of the present invention includes an arrangement for directly delivering unheated vaporized gasoline to the combustion chambers of an internal combustion engine including a vacuum pump for drawing off vaporized gasoline from a liquid gasoline supply tank. The amount of unheated vaporized gasoline supplied to the engine is not controlled by the operator during the operation of the engine (although adjustable controls are provided for presetting the amount of fuel vapor to be metered) and no separate vaporizers, preheaters, preburners or the like are generally required to provide vaporization of the gasoline, although an optional agitator can be employed for providing vaporization under certain specialized conditions. Air is also supplied to the engine for combustion with the gas vapor, the air being heated prior to delivery to the combustion chamber and the amount of air supplied being controlled by the operator.

According to the preferred embodiment of the invention, the vaporized gasoline is passed through a filter compartment which removes undesired contaminants and helps to reduce pollutant emissions. It will be appreciated that the use of vaporized fuel further reduces pollutant emissions in that a number of pollutants can be traced to unburned particles or drops of liquid fuel associated with conventional automobile engines. In the preferred embodiment, each intake duct of the internal combustion engine is separately supplied with the vaporized gasoline through a separate hose. By providing a preset adjustable valve in each hose, the amount of vaporized gasoline delivered to the intake duct is precisely controlled so that only that amount of vaporized gasoline necessary for combustion is provided to each intake duct. During "normal" operation of the engine, a primary air valve controls the speed of the engine. The primary valve is selectively connectable to a secondary air valve which is caused to open to deliver additional combustion air when needed for engine acceleration. In order to heat the combustion air, a heat exchanger is provided. The heat exchanger obtains heat energy from the engine, preferably using either the liquid coolant or the exhaust gases of the engine. The heat exchanger is formed in an adaptor plate containing air baffles therein and a channel through which a heat exchange medium flows. This plate is the only element of the system which must be changed to adapt the system to different engines, the size and/or number of the orifices on the air baffles being matched to the engine parameters (compression ratio, etc.).

Other features and advantages of the present invention will be set forth in, or apparent from, the detailed description of presently preferred embodiments of the invention found hereinbelow.

DETAILED DESCRIPTION OF A PREFERRED EMBODIMENT

Figure 1:
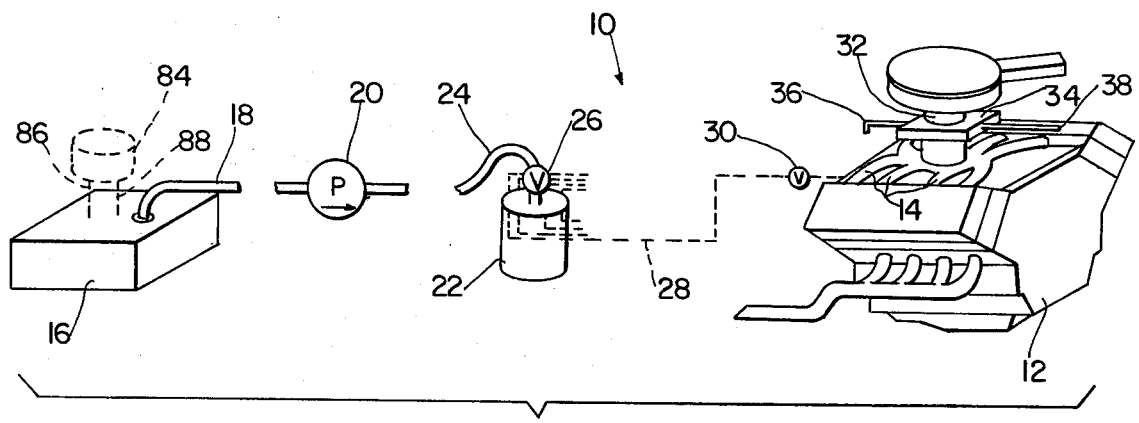
FIG. 1 is a diagrammatic perspective view of a conventional internal combustion engine incorporating a fuel air injection control system of the present invention.

With reference now to the drawings in which like numerals represent like elements throughout the several views, a presently preferred embodiment of the fuel-air injection control system of the present invention is depicted schematically in FIG. 1 and is generally denoted 10 in that figure. The system 10 is shown in use with a conventional internal combustion engine 12. Although engine 12 is illustrated as a V-8 engine, the present invention is, of course, readily adapted to different sizes and configurations of internal combustion engines. As shown, engine 12 includes a number of conventional air intake ducts 14, one for each of the eight combustion chambers of engine 12.

Generally speaking, in order for system 10 to function properly, a substantially airtight liquid fuel supply tank indicated at 16, must be provided. While many motor vehicles are conventionally provided with an airtight fuel tank, other existing fuel tanks can also be used satisfactorily, so long as the tanks can be made substantially airtight. In general, this is readily done by appropriately modifying the filler cap or filler opening. In a preferred embodiment of the present invention, a tube 18 is connected to fuel tank 16 at the highest point in fuel tank 16 so that when fuel tank 16 is filled with liquid gasoline, no liquid gasoline enters tube 18. The other end of tube 18 is connected to the inlet of a vacuum pump 20. The outlet of vacuum pump 20 is connected by a tube 24 to a filter compartment 22. As shown, an adjustable valve 26 is located in tube 24 adjacent to filter compartment 22. Filter compartment 22 is directly connected to each of the intake ducts 14 of engine 12 by a series of hoses 28. Each hose 28 also includes an adjustable valve 30 connected therein.

The system 10 utilizes an air intake or injector device 32 which can, for example, be built from a standard carburetor whose fuel supply inlet is disconnected and sealed. It will be understood that the air intake device 32 functions solely to provide intake air and other devices can, of course, be used for this purpose. The air intake device 32 is modified by providing a heat exchanger, indicated at 34, between air intake 32 and the common intake opening of intake ducts 14. Heat exchanger 34 is connected to the engine coolant system by a hose 36 and to the vehicle radiator by hose 38. Heat exchanger 34 operates to heat the intake air to a desired temperature for delivery as hot combustion air to the engine.

Figure 2:
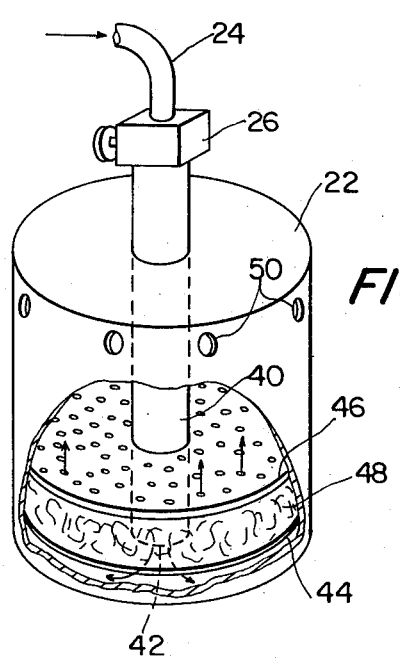
FIG. 2 is a partially broken away perspective view of a filter compartment forming part of the system depicted in FIG. 1.

Filter compartment 22 is shown in greater detail in FIG. 2. In fluid communication with inlet tube 24 and adjustable valve 26 is a pipe or tube 40 having an outlet opening 42 disposed just above the bottom of filter compartment 22. Located above outlet opening 42 and spaced between pipe 40 and the inner wall of filter 22 is a perforated plate 44. A second perforated plate 46 is located a predetermined distance above perforated plate 44 and filter material 48 is located in the space between perforated plates 44 and 46. Filter material 48 advantageously comprises activated charcoal impregnated with platinum which acts to adsorb the undesired contaminants in the gas vapor. Located above perforated plate 46 and around the periphery of filter compartment 22 are a series of outlets 50. Each outlet 50 is connected to a respective one of the hoses 28 which lead to the individual intake ducts 14.

Figure 3:
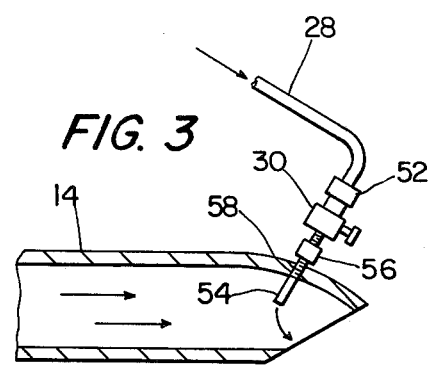
FIG. 3 is a cross-sectional elevation view of one of the intake ducts of the internal combustion engine depicted in FIG. 1.

A typical intake duct 14 is depicted in FIG. 3. As shown, hose 28 is connected to the adjustable valve 30 by a first hose fitting 52, valve 30 being, in turn, fluidly connected to a stem 54 by a further hose fitting 56. Hose fitting 56 includes a threaded portion 58 which is threadably received in the wall of intake duct 14. Stem 54 extends approximately to the center of intake duct 14.

Figure 4:
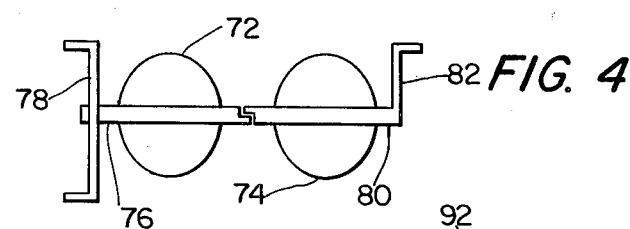
FIG. 4 is a plan view of the primary and secondary air valves of the internal combustion engine depicted in FIG. 1.

As discussed above, the air intake device 32 is, in an exemplary embodiment, adapted from a conventional carburetor and thus only certain details thereof which are helpful in understanding the invention are illustrated in the drawings. Shown in FIG. 4 are the primary butterfly valve 72 and secondary butterfly valve 74 which are commonly found in such a carburetor and which serve to control the combustion air intake of device 32. Primary valve 72 is fixedly attached to a rotatable shaft 76 which has a control level 78 at the outer end thereof which is adapted to be operated by the accelerator pedal. Secondary valve 74 is similarly fixedly mounted to a separate rotatable shaft 80 having a choke lever 82 at the outer end thereof. The inner end of shafts 76 and 80 are both of a half moon shape and, as shown, normally overlap one another without being in engagement. With this construction, primary valve 72 and rotatable shaft 76 rotate separately from secondary valve 74 and rotatable shaft 80 for certain settings of shaft 76, but can be set so that the ends of shafts 76 and 80 are in engagement and both primary valve 72 and secondary valve 74 rotate together. Rotation of shaft 76 is controlled by the operator through the connection between control level 78 and the accelerator pedal and, in particular, the shafts 76, 80 are set so as to be brought into engagement when the accelerator pedal is fully depressed. With this arrangement air is normally supplied only through the air intake path controlled by valve 72 and at high speeds or under heavy loads, additional air is supplied through the air intake path controlled by valve 74 in response to the accelerator pedal being fully depressed.

Figure 5:
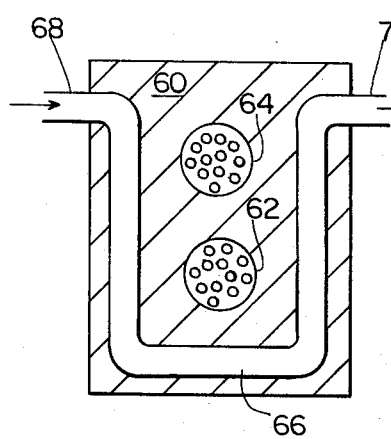
FIG. 5 is a cross-sectional plan view of the heat exchanger depicted in FIG. 1.

Heat exchanger 34 is shown in more detail in FIG. 5. Heat exchanger 34 includes a metallic body portion or plate 60. Located in body portion 60 are a primary baffle 62 and a secondary baffle 64 which are respectively disposed in the air flow paths controlled by valves 72 and 74 and serve to assist in the control of the flow of combustion air from air intake device 32. Both baffles 62 and 64 have a plurality of orifices therein, the number and size of these orifices varying in dependence upon the size and compression ratio of engine 12. Passing around primary and secondary baffles 62 and 64 through body portion 60 is a heat exchange passage 66 having an inlet 68 and an outlet 70. Inlet 68 is fluidly attached to hose 36 while outlet 70 is fluidly attached to hose 38. Thus, the heat exchange fluid flowing in passage 66 from the engine 12 will heat the air flowing through baffles 60 and 62. As discussed above, the air intake device 32 is, in an exemplary embodiment, adopted from a conventional carburetor and thus only certain details thereof which are helpful in understanding the invention are illustrated in the drawings.

The system of the invention is preferably adapted for use on an existing motor vehicle in the following manner. Tube 18 is connected from the top of the airtight fuel tank 16 to the vacuum pump 20 which is mounted adjacent to air intake control device 32 on engine 12. A suitable vacuum pump is the electric pump manufactured by AC Spark Plug as Model No. 12V-EP12, under U.S. Pat. No. 3,273,086. This pump exerts a pressure of approximately fifteen psi in fuel tank 16. The filter compartment 22 is also mounted on engine 12 adjacent vacuum pump 20. From filter 22, individual hoses 28 lead to the various intake ducts 14 of engine 12. In order to modify engine 12 to receive hoses 28, it is only necessary to drill and tap a suitable threaded hole in each intake duct 14 to which hose 28 can be attached. As noted above, when air intake device 32 is built from a standard carburetor, the fuel line normally associated with the carburetor must be disconnected and both the outlet of the fuel line and inlet to the carburetor suitably sealed. The plate 60 of heat exchanger 34 is located between air intake device 32 and the common intake opening for intake ducts 14. Heat exchanger plate 60 is disposed so that the primary baffle 62 and secondary baffle 64 are located immediately below the air channels or paths in device 32 in which primary air valve 72 and secondary air valve 74 are disposed. The inlet port 68 of heat exchanger 34 is suitably connected to the hot coolant circulating through engine 12. Conveniently, a hole can be drilled and tapped in one of the coolant channels in engine 12 and a hose and appropriate fitting used to conduct the hot coolant fluid to inlet 68. The outlet port 70 of heat exchanger 34 is connected to the coolant hose leading to the radiator by a suitable coupling (not shown). With the simple modifications discussed above, the standard engine of a motor vehicle can be readily adapted to incorporate the fuel-air injection control system of the present invention.

In operation, the system of the invention functions in the following manner. Actuation of vacuum pump 20 causes gas and air vapor from the tank 16 containing liquid gasoline to be continuously pumped from tank 16 through hoses or tubes 18 and 24 and adjustable valve 26 into filter compartment 22. Adjustable valve 26 is used to provide a gross adjustment to control the amount of vaporized gasoline admitted to filter compartment 22. The vaporized gasoline entering through valve 26 passes to the bottom of filter compartment 22 through pipe 40 and out of outlet opening 42. The vaporized gasoline then rises through perforated plate 44, filter material 48, and perforated plate 46. As stated above, filter material 48 provides for removal of undesirable contaminants in the vaporized gasoline and thus acts to reduce the pollutant emissions in the exhaust gases of engine 12. After passing through perforated plate 46, the vaporized gasoline passes through the outlets 50 provided in filter compartment 22. From outlets 50, the vaporized gasoline passes through the respective hoses 28 attached thereto through an associated valve 30 to a corresponding intake duct 14. Each adjustable valve 30 is adjusted during installation of the system to meter the amount of vaporized gasoline into the corresponding intake duct 14 which is necessary to support combustion in the associated combustion chamber. The adjustment of each valve 30 also acts to compensate for the reduced delivery of gasoline vapors to intake ducts 14 which are more remote from filter 22. With these adjustments, an equal volume of vaporized gasoline is delivered to each intake duct 14. As shown in FIG. 3, the vaporized gasoline is directed to the center of intake duct 14 by a stem 54.

Air for combustion is supplied to the combustion chambers through air intake device 32. The volume of combustion air supplied to engine 12 is controlled by the standard throttle linkage associated with the motor vehicle which is normally attached to control lever 78. Thus, the throttle linkage of the motor vehicle acts to control the speed of the engine by controlling the amount of combustion air admitted to engine 12. The combustion air is drawn through primary valve 72 and, under the circumstances described above, through secondary valve 74 and passes through heat exchange primary baffle 62 (and, depending on the circumstances, through secondary baffle 64). The hot liquid coolant flowing in inlet 68, around primary baffle 62 and secondary baffle 64 in passage 66, and out of outlet 70, is heated to a temperature which is controlled by the coolant thermostat so that the combustion air passing through baffles 62 (and 64) is heated to the desired temperature. After passing through baffle 62 (and 64), the combustion air enters the common opening of intake ducts 14 and is drawn through individual intake ducts 14 by the engine vacuum. While traveling through each individual intake duct 14, the combustion air is combined with vaporized gasoline exiting from stem 54 into the middle of intake duct 14. The mixture of heated combustion air and vaporized gasoline is conducted to the associated combustion chamber. In the combustion chamber, the precisely heated combustion air acts to promote full combustion of the metered volume of the vaporized gasoline which further reduces the pollutant emissions in the exhaust gases of engine 12.

As explained above, the speed of engine 12 is controlled by a throttle linkage attached to lever 78. During steady state operation of engine 12, primary butterfly valve 72 rotates on rotatable shaft 76 to admit all of the combustion air needed. Rotatable shaft 76, in this steady state mode of operation, does not rotate far enough to contact the inner end of rotatable shaft 80 to which secondary butterfly valve 74 is attached. However, for high speeds or heavy loads where the accelerator pedal is fully depressed, rotatable shaft 76 is rotated far enough to engage rotatable shaft 80 so that secondary butterfly valve 74 is also opened. The opening of secondary butterfly valve 74 increases the volume of combustion air supplied to engine 12 so that the power of engine 12 increases. The operation of primary butterfly valve 72 and secondary butterfly valve 74 is substantially the same as would occur in a standard motor vehicle, except that valves 72 and 74 of the system of the invention serve to control the amount of combustion air admitted to the engine 12.

It should be noted that while an embodiment of the invention has been described wherein the heat exchanger 34 employs the hot coolant liquid of engine 12 as a source of heat for heating the combustion air, the hot exhaust gases from engine 12 are also a suitable source of heat for heat exchanger 34. In addition, in order to precisely control the temperature of the fluid circulating through heat exchanger 34, a number of different types of thermostats or other temperature control devices can be used. It should also be noted that while the present invention has been described as utilizing a modified carburetor as an air intake device, other forms of air intake devices can be designed and used for this purpose.

An optional feature of the invention concerns the provision of an agitator or like device shown in dashed lines and denoted 84 in FIG. 1, for use in providing vaporization of the liquid fuel in the tank under certain circumstances. For example, after an automobile has been parked for an extended period, it is helpful to augment the fuel vapors normally found in the tank with additional vapors generated by agitators 84 so that sufficient fuel vapors for combustion will be immediately available upon starting. The agitator 84 preferably includes an intake line 86 which extends to a position near the bottom of fuel tank 16 and through which fuel is drawn into agitator 84, and an outlet line 88 which opens at the top of tank 16 and through which fuel vapors are released into the top of the tank. The agitator 84 simply provides for agitation of the liquid fuel so as to produce gaseous fuel and many known commercially available devices can be used for this purpose. Moreover, many types of other known "fuel vaporizers" can also be employed. The agitator 84 is remotely controlled by the operator of the automobile so that use of the agitator is restricted to those circumstances wherein additional vaporized fuel is necessary. For example, in one preferred embodiment, the agitator 84 includes a electric pump or motor (not shown) energization of which is remotely controlled by an off-on switch on the dashboard.

Figure 6:
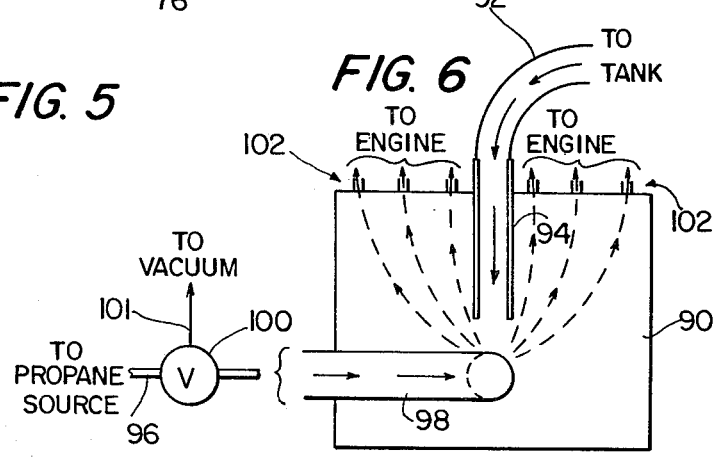
FIG. 6 is schematic diagram of fuel supply arrangement in accordance with a further embodiment of the invention.

It should be understood that although the invention has been described above in terms of using vaporized gasoline as the fuel vapor, other fuels can also be employed. For example, propane, either alone or mixed with gasoline vapors, can be used. Other such fuels that are suitable for use include butane and natural gas. Such fuels would, of course, be stored in gaseous form in a fuel tank designed for this purpose. Thus, referring to FIG. 6, a mixing chamber 90 is shown, which generally corresponds to that illustrated in FIG. 2 but which has been adapted for use with a gaseous fuel such as propane. Chamber 90 receives fuel vapors from the gasoline tank, or from a vaporizer, through a gasoline vapor supply line 92 and inlet tube 94 and also receives propane or a like gaseous fuel from a suitable source through a supply line, indicated schematically at 96, and an inlet connection 98. A vacuum-operated valve 100 located in supply line 96, and connected to the engine vacuum through a control line 101, controls the supply of propane to chamber 90 in accordance with engine demand vacuum. Thus, a mixture of propane and gasoline vapor is supplied to the engine through outlets 102 and the amount of propane supplied is a function of the engine demand as reflected in the opening of valve 100. At idling speeds of the engine, valve 100 is substantially closed, and opens at the demand of the engine during acceleration to supply additional propane to the engine. It will, of course, be appreciated that, as stated, fuel gases other than propane can be used, and propane and the like can also be used as the sole fuel, i.e., without gasoline vapor.

Thus, while the invention has been described in detail with respect to an exemplary embodiment thereof, it will be understood by those with ordinary skill in the art that these and other variations and modifications may be effected in the exemplary embodiment within the scope and spirit of the invention.

I claim:

1. A fuel-air injection control system for feeding air and fuel vapor to the combustion chambers of an internal combustion engine wherein combustion air is drawn into the intake ducts of the engine by the engine vacuum, said system comprising:
    means for directly delivering unheated and unmixed fuel vapor to the combustion chambers of the engine including vacuum pump means connected to a fuel supply tank for continuously drawing off fuel vapor from the tank and means for supplying the fuel operator controlled vapor to the combustion chambers of the engine;
    means for selectively controlling the amount of combustion air which is drawn into the intake ducts by the engine vacuum; and
    means for heating the controlled amount of combustion air which is drawn into the intake ducts and for supplying the heated combustion air to the combustion chambers so as to provide a mixture of unheated fuel vapor with the heated combustion air for ignition.

2. A system as claimed in claim 1 wherein said fuel supply tank comprises a gasoline supply tank containing liquid gasoline and wherein said pump means continuously draws off vaporized gasoline produced from the liquid gasoline.

3. A system as claimed in claim 2 further comprising adjustment means for adjustably presetting the amount of vaporized gasoline delivered to each individual one of the combustion chambers.

4. A system as claimed in claim 2 wherein said vaporized gasoline delivery means includes filter means for removing undesired contaminants from the vaporized gasoline.

5. A system as claimed in claim 2 wherein said means for delivering the vaporized gasoline to each combustion chamber includes a plurality of separate fluid connections each of which is connected to a respective one of the intake ducts of the combustion chamber of the engine and includes an adjustable valve located therein for metering the amount of vaporized gasoline delivered to the respective intake duct.

6. A system as claimed in claim 1 wherein said heating means comprises a heat exchanger which employs heat derived from the operation of the engine.

7. A system as claimed in claim 6 wherein the engine includes an air intake manifold and said heat exchanger comprises an adaptor plate which is mounted on the air intake manifold and which includes air passages therein adapted to permit an amount of air therethrough which is matched to the specifications of the engine.

8. A system as claimed in claim 7 wherein said adaptor plate includes a channel therein which is located adjacent said air passages and in which, in use, a heat exchange medium flows.

9. A system for feeding air and vaporized gasoline to the combustion chambers of an internal combustion engine wherein air is drawn into intake ducts of the engine by engine vacuum, said system comprising:

an airtight fuel supply tank containing a liquid gasoline;

a vacuum pump having an inlet and an outlet;

means for connecting the inlet of said vacuum pump to the top of said fuel supply tank such that the vacuum produced by said vacuum pump causes a portion of the liquid gasoline to be continuously vaporized and drawn from the supply tank;

means for connecting the outlet of said vacuum pump to the intake ducts of the combustion chambers of the engine so that the vaporized gasoline is directly delivered in an unheated and unmixed state to the combustion chambers;

operator controlled means for selectively controlling the amount of air which is drawn into the engine by the engine vacuum; and means for heating the air which is drawn into the engine and for supplying the heated and controlled air to the intake ducts of the engine such that the vaporized gasoline mixes with the heated and controlled combustion air for subsequent ignition in the combustion chambers to power the engine.

10. A system as claimed in claim 9 further including a filter means for removing undesired contaminants from the vaporized gasoline as the vaporized gasoline is delivered to the intake ducts from said vacuum pump.

11. A system as claimed in claim 10 wherein said means for connecting the outlet of said vacuum pump to the intake ducts includes a plurality of separate hoses individually connected to respective ones of said combustion chambers, the outlet of said vacuum pump being connected to an input of said filter means and said hoses individually connecting said filter means with respective ones of the intake ducts of the respective combustion chambers.

12. A system as claimed in claim 11 further including a like plurality of adjustable valves individually included in respective ones of said hoses for controlling the flow of the vaporized gasoline through said hoses.

13. A system as claimed in claim 12 further including an adjustable valve for controlling the amount of vaporized gasoline delivered to said filter means from said vacuum pump.

14. A system as claimed in claim 9 wherein said means for selectively controlling the amount of air includes a primary variable air inlet valve which is manually operated to control the speed of the engine and a secondary variable air inlet valve which is operated intermittently to deliver additional air as needed.

15. A system as claimed in claim 14 wherein said means for heating the combustion air comprises a heat exchanger which employs the heat energy of combustion to heat the intake air.

16. A system as claimed in claim 15 wherein said heat exchanger includes primary and secondary air baffles through which pass the intake air drawn through said primary and secondary valves, respectively, said baffles having a plurality of orifices therein.

17. A system as claimed in claim 16 wherein said heat exchanger includes a passage located therein adjacent to said primary and secondary baffles, said passage being in fluid communication with hot liquid coolant passing through the engine.

18. A system as claimed in claim 2 further comprising auxiliary action vaporizer means for assisting in vaporizing the fuel in the gasoline supply tank for delivery by said vacuum pump means when the system is stationary.

19. A system as claimed in claim 1, wherein said fuel vapor comprises a fuel gas stored in a gaseous form in said supply tank.

20. A system as claimed in claim 19 wherein fuel gas is mixed with gasoline vapor to provide said fuel vapor.

21. A system as claimed in claim 1 comprising a mixing chamber which receives gasoline vapor from a gasoline tank and a fuel gas from a further supply and which provides for mixing of said gasoline vapor and said fuel gas to produce said fuel vapor, the amount of at least one of the components of the fuel vapor being a function of engine demand.

22. A system as claimed in claim 21, comprising an engine vacuum responsive control valve for controlling the amount of the fuel gas component of said fuel vapor.

23. A system as claimed in any one of claims 1, 19 or claim 22 wherein said fuel gas comprises propane.

* * * * *